United States Patent [19]

Koshizuka et al.

[11] Patent Number: 5,064,743

[45] Date of Patent: Nov. 12, 1991

[54] THERMAL TRANSFER RECORDING MEDIUM

[75] Inventors: Kunihiro Koshizuka; Toshiaki Tezuka; Takao Abe, all of Hino, Japan

[73] Assignee: Konica Corporation, Tokyo, Japan

[21] Appl. No.: 352,108

[22] Filed: May 15, 1989

[30] Foreign Application Priority Data

May 18, 1988 [JP] Japan ............................... 63-121622

[51] Int. Cl.[5] .......................... G03C 3/00; B32B 3/00; B41M 5/20

[52] U.S. Cl. .................................... 430/253; 430/964; 503/201; 250/316.1; 250/317.1; 250/318; 428/195; 428/488.4

[58] Field of Search ............... 430/253, 495, 961, 964; 503/201; 250/318, 317.1, 316.1, 318.1; 428/195, 488.4

[56] References Cited

U.S. PATENT DOCUMENTS

| | | | |
|---|---|---|---|
| 4,411,979 | 10/1983 | Nagamoto et al. | 250/316.1 |
| 4,497,887 | 2/1985 | Watanabe et al. | 250/316.1 |
| 4,623,580 | 11/1986 | Koshizuka et al. | 428/216 |
| 4,707,406 | 11/1987 | Inaba et al. | 428/914 |
| 4,708,903 | 11/1987 | Tanaka et al. | 428/195 |
| 4,755,432 | 7/1988 | Asano et al. | 428/421 |
| 4,818,591 | 4/1989 | Kitamura et al. | 428/914 |
| 4,895,826 | 1/1990 | Watanabe et al. | 503/202 |
| 4,925,735 | 5/1990 | Koshizuka et al. | 428/914 |

FOREIGN PATENT DOCUMENTS

| | | |
|---|---|---|
| 0154438 | 9/1985 | European Pat. Off. . |
| 0198505 | 10/1986 | European Pat. Off. . |
| 0208385 | 1/1987 | European Pat. Off. . |
| 63-57284 | 3/1988 | Japan . |
| 63-84981 | 4/1988 | Japan . |
| 1-99878 | 4/1989 | Japan . |

OTHER PUBLICATIONS

Patents Abstracts of Japan vol. 11, No. 39 (M-559) (2486) 05 Feb. 1987, & JP-A-61 206694 (Alps Electric Co. Ltd.) 12 Sep. 1986.

Patents Abstracts of Japan vol. 12, No. 36 (M-664) (2883) 03 Feb. 1988, & JP-A-62 189191 (Canon Inc.) 18 Aug. 1987.

*Primary Examiner*—Charles L. Bowers, Jr.

*Assistant Examiner*—Ashley I. Pezzner

*Attorney, Agent, or Firm*—Frishauf, Holtz, Goodman & Woodward

[57] ABSTRACT

A thermal transfer recording medium having a support and provided thereon, plural heat softening layers is disclosed. The thermal transfer recording medium comprses one of the following Constitutions (1) to (3);

Constitution (1): a support, the first heat softening layer containing at least a colorant and a fusible material, and the second heat softening layer containing at least a thermoplastic resin and a nonionic surfactant, in this sequence, wherein said second heat softening layer is substantially colorless;

Constitution (2): a support, the first heat softening layer containing at least a colorant and a fusible material, and the second heat softening layer containing at least a thermoplastic resin and a tackifier, in this sequence, wherein said second heat softening layer is substantially colorless;

Constitution (3): a support, the first heat softening layer containing at least a fusible material, the second heat softening layer containing at least a colorant and a thermoplastic resin, and the third heat softening layer containing at least a fusible material, in this sequence, wherein said third heat softening layer is substantially colorless.

28 Claims, No Drawings

THERMAL TRANSFER RECORDING MEDIUM

FIELD OF THE INVENTION

The present invention relates to a thermal transfer recording medium, more specifically to a thermal transfer recording medium capable of forming high quality printed images on a receiving medium of poor surface smoothness and providing high printing quality even in high speed printing.

BACKGROUND OF THE INVENTION

In recent years, a thermal transfer recording medium comprising a support and a heat softening layer provided thereon have come to be widely used with popularization of a thermal transfer apparatus for a word-processor.

However, a conventional thermal transfer recording medium has a problem that printing quality is liable to be affected by surface smoothness of a receiving medium (transfer paper etc ) and to be noticeably degraded when printing speed increases.

Taking note of these conditions, various attempts have been made, where heat softening layers for a thermal transfer recording medium are multiplied, or various additives are added to a heat softening layer, for improving printing quality in printing on a receiving medium of poor surface smoothness.

For example, a method is known, in which a surfactant is added to form high quality printed images free of blurs even on a receiving medium of poor surface smoothness.

However, it has been impossible to add a necessary amount of surfactant because addition of a surfactant induces another stain problem.

SUMMARY OF THE INVENTION

The present invention has been made in the above circumstances.

The object of the present invention is to provide a thermal transfer recording medium capable of forming high quality printed images of excellent sharpness free of voids, stain, and tailing, on a receiving medium of poor surface smoothness, and capable of well suppressing printing quality reduction in high speed printing.

To solve these problems, the present inventors investigated and found that a thermal transfer recording medium comprising a support and provided thereon, two or three heat softening layers where a colorant and a nonionic surfactant or a tackifier are contained in different layers is capable of forming high quality printed images free of stain on a receiving medium of poor surface smoothness and well suppressing printing quality reduction in high speed printing.

To be more concrete, the present invention comprises Constitution (1): in a thermal transfer recording medium comprising the first and second heat softening layers provided on a support in this sequence, said first heat softening layer contains at least a colorant and a fusible material, and said second heat softening layer contains at least a thermoplastic resin and a nonionic surfactant and is substantially colorless; Constitution (2) in a thermal transfer recording medium of the same layer structure as Constitution (1), said first heat softening layer contains at least a colorant and a fusible material, and the second heat softening layer contains at least a thermoplastic resin and a tackifier and is substantially colorless, or Constitution (3): in a thermal transfer recording medium comprising the first, second and third heat softening layers provided on the support in this sequence, said first heat softening layer contains at least a fusible material, said second heat softening layer contains at least a colorant and a thermoplastic resin, and said third heat softening layer contains at least a thermoplastic resin and is substantially colorless.

The thermal transfer recording medium of the present invention may have other layers, as long as it is not adversely affected by them. For example, the first heat softening layer may be provided on the support via another layer such as a peeling layer; another layer such as an interlayer may be provided under the second heat softening layer.

Next, the constitution of the thermal transfer recording medium of the present invention is described below.

Support

It is desirable that the support for the thermal transfer recording medium of the present invention possess good heat resistance and high dimensional stability.

The examples of the material for it include papers such as plain paper, condensor paper, laminated paper and coated paper; resin films made of polyethylene, polyethylene terephthalate, polystyrene, polypropylene and polyimide; paper laminated with resin film; and metal sheets such as aluminum foil.

A thickness of the support is normally less than 30 μm, preferably 2 to 30 μm. The thickness exceeding 30 μm may decrease heat conductivity and deteriorate printing quality.

The constitution of the back face of the support can be arbitrarily chosen; for example, a backing layer such as an anti-sticking layer may be provided.

On the support is provided the first heat softening layer as described in detail below in direct contact with the support or via a conventional peeling layer or an anchor layer.

First Heat Softening Layer

One of the key points in the present invention is that the first heat softening layer contains at least a colorant and a fusible material; or it contains a fusible material alone, provided that the third heat softening layer is provided on the second heat softening layer.

The first heat softening layer comprises a function of rapidly peeling off from the support and improving a printing property in high speed printing.

This function of the first heat softening layer is provided mainly by the fusible material contained therein.

The examples of the fusible material include vegetable waxes such as carnauba wax, Japan wax, auriculae wax and esparto wax; animal waxes such as beeswax, insect wax, shellac wax and spermaceti wax; petroleum waxes such as paraffin wax, microcrystalline wax, polyethylene wax, ester wax and acid wax; and mineral waxes such as montan wax, ozokerite and cerecine. In addition to these waxes, the examples include higher fatty acids such as palmitic acid, stearic acid, margaric acid and behenic acid; higher alcohols such as palmityl alcohol, stearyl alcohol, behenyl alcohol, marganyl alcohol, myricyl alcohol and eicosanol; higher fatty esters such as cetyl palmitate, myricyl palmitate, cetyl stearate and myricyl stearate; amides such as acetamide, propionic amide, palmitic amide, stearic amide and amide wax; and higher amines such as stearyl amine, behenyl amine and palmityl amine.

These substances may be used singly or in combination.

Of these materials, the waxes having a melting point of 50° to 100° C. are preferred.

In Constitutions (1) and (2), a content ratio of the fusible material in the first heat softening layer is normally 5 to 95% by weight of the total amount of the constituents of the first heat softening layer, preferably 50 to 90% by weight, and more preferably 60 and 80% by weight; in Constitution (3), it is normally 5-100% by weight, preferably 50-95% by weight, and more preferably 60-90% by weight.

The examples of the colorant include inorganic and organic pigments and dyes.

The examples of the inorganic pigment include titanium dioxide, carbon black, zinc oxide, Prussian Blue, cadmium sulfide, iron oxide, and chromates of lead, zinc, barium and calcium.

The examples of the organic pigment include azo, thioindigo, anthraquinone, anthoanthrone and triphendioxazine pigments, vat dye pigments, phthalocyanine pigments such as copper phthalocyanine and its derivatives, and quinacridone pigment.

The examples of the dye include acid dyes, direct dyes, disperse dyes, oil soluble dyes and metal-containing oil soluble dyes.

In Constitutions (1) and (2), a content ratio of the colorant in the first heat softening layer is normally 5 to 40% by weight, preferably 10 to 30% by weight; no colorant is contained in Consititution (3).

The first heat softening layer may contain a thermoplastic resin as well as the fusible material and the colorant.

The examples of the thermoplastic resin include resins such as ethylene copolymers, polyamide resins, polyester resins, polyurethane resins, polyolefin resins, acrylic resins, vinyl chloride resins, cellulose resins, rosin resins, ionomer resins and petroleum resins; elastomers such as natural rubber, styrene-butadiene rubber, isoprene rubber, chloroprene rubber and diene copolymers; rosin derivatives such as ester rubber, rosin-maleic acid resin, rosin-phenol resin and hydrogenated rosin; and high molecular compounds having a softening point of 50° to 150° C. such as phenol resins, terpene resins, cyclopentadiene resins and aromatic hydrocarbon resins.

Of these thermoplastic resins, acrylic resins, diene copolymers, and ethylene copolymers are preferred, since they can provide a thermal transfer recording medium especially with excellent printing quality in high speed printing.

The preferred thermoplastic resins are described below.

The examples of the acrylic resin include acrylic resins prepared by polymerizing a monobasic carboxylic acid such as methacrylic acid or ester thereof with at least one compound capable of copolymerizing therewith.

The examples of the carboxilyc acid or ester thereof include methacrylic acid, methyl methacrylate, ethyl methacrylate, isopropyl methacrylate, butyl methacrylate, isobutyl methacrylate, hexyl methacrylate, octyl methacrylate, 2-ethyhexyl methacrylate, decyl methacrylate, dodecyl methacrylate and hydroxyethyl methacrylate.

The examples of the compound capable of copolymization include vinyl acetate, vinyl chloride, vinylidene chloride, maleic anhydride, fumaric anhydride, styrene, 2-metylstyrene, chlorostyrene,acrylonitrile, vinyltoluene, N-methylol methacrylamide, N-butoxymethyl methacrylamide, vinylpyridine and N-vinylpyrrolidone.

The examples of the diene copolymer include butadiene-styrene copolymers, butadiene-styrene-vinylpyridine copolymers, butadiene-acrylonitrile copolymers, chloroprene-styrene copolymers and chloroprene-acrylonitrile copolymers.

The examples of the ethylene copolymer include ethylne-vinyl acetate copolymers, ethylene-ethyl acrylate copolymers, ethylene-methyl methacrylate copolymers, ethylene-isobutyl acrylate copolymers, ethylene-acrylic acid copolymers, ethylene-vinyl alcohol copolymers, ethylene-vinyl chloride copolymers and ethylene-acrylic acid metal salt copolymers.

These substances may be used singly or in combination.

In Constitution (1), a content ratio of the thermoplastic resin in the first heat softening layer is normally 1 to 40% by weight, preferably 3 to 20% by weight, and more preferably 5 to 15% by weight; in Constitution (2), it is normally 0.3-4.0% by weight, preferably 0.5-3.0% by weight, and more preferably 0.8-2.5% by weight; further, in Constitution (3), it is preferably 0-35% by weight, more preferably 2-20% by weight.

The first heat softening layer may contain a surfactant such as a compound having a polyoxyethylene chain for controlling a peeling properly, in addition to the above-mentioned components.

Inorganic or organic fine grains such as metal powder and silica gel, or oils such as linseed oil, mineral oil, may also be added.

The first heat softening layer can be coated by hot melt coating, aqueous coating, coating using an organic solvent, or other coating methods.

In Constitution (1), a thickness of the first heat softening layer is normally 0.3 to 8.0 μm, preferably 0.5 to 6.0 μm; in Constitution (2), it is preferably 0.6-8.0 μm, more preferably 1.0-5.0 μm; further, in Constitution (3), it is preferably 0.5-5.0 μm.

On the first heat softening layer is provided the second heat softening layer as described in detail below in direct contact therewith or via another layer such as an interlayer.

Second Heat Softening Layer

Another key point in the present invention is that the second heat softening layer contains at least a thermoplastic resin and a nonionic surfactant [Constitution (1)] or a tackifier [Constitution (2)]; or it contains thermoplastic resin and a colorant [Constitution (3)], provided that the third heat softening layer is provided on the second heat softening layer. The second heat softening layer is provided on the first heat softening layer in direct contact therewith or via another layer such as an interlayer.

The second heat softening layer has a tensile strength suitable for a thermal transfer recording medium and a function of forming high quality printed images even on a transfer medium of poor surface smoothness such as what is called rough paper.

This function of the second heat softening layer is provided by the thermoplastic resin and the nonionic surfactant or the tackifier contained therein.

The thermoplastic resin and the nonionic surfactant or the tackifier rapidly softens the second heat softening layer in heating with a thermal head of a printer to improve its adhesion to a receiving medium, and provides high quality printed images of excellent resolution free of voids, stain and tailing.

The nonionic surfactant used for the present invention may be any one of an ether type, an ether-ester type, an ester type, and a nitrogen-containing type. The examples of the nonionic surfactant include polyhydric alcohols such as sorbitan, glycerol, propylene glycol, pentaeryhthritol and ethylene glycol; fatty acid esters of condensed products of the preceding polyhydric alcohols, such as polyglycerol and polyethylene glycol; and fatty acid esters.

More specifically, the examples include ether type nonionic surfactants such as polyoxyethylene alkyl ethers, linear polyoxyethylene alkyl ethers, polyoxyethylene secondary alcohol ethers, polyoxyethylene alkylphenyl ethers, polyoxyethylene sterol ether, ethylene oxide derivatives of alkylphenol-formalin condensed products, polyoxyethylene-polyoxypropylene block polymers and polyoxyethylene polyoxypropylene alkyl ethers; ether-ester type nonionic surfactants such as polyoxyethylene glycerol fatty acid esters, polyoxyethylene castor oil and hardened castor oil, polyoxyethylene sorbitan fatty acid esters and polyoxyethylene sorbitol fatty acid esters; ester type nonionic surfactants such as polyethylene glycol fatty acid esters, fatty acid monoglycerides, polyglycerol fatty acid esters, sorbitan fatty acid esters and propylene glycol fatty acid esters; and nitrogen-containing nonionic surfactants such as fatty acid alkanolamides, polyoxyethylene fatty acid amides, polyoxyethylene alkylamines and alkylmaine oxides.

These substances may be used singly or in combination.

Of these substances, fatty acid esters and fatty acid ethers of polyoxyethylene and its condensed product are preferred.

A content ratio of the nonionic surfactant in the second heat softening layer is normally 1 to 50% by weight, preferably 3 to 30% by weight of the total amount of the constituents.

Printing quality can be improved by limiting the content ratio of the nonionic surfactant in the second heat softening layer to the above range.

The tackifier added to the second heat softening layer is a hydrocarbon compound having a polar group such as a hydroxyl group and a carboxyl group, and exhibits tackiness when used singly or in combination with another component.

The examples of the tackifier include unmodified or modified rosins such as rosins, hydrogenated rosins, rosin-maleic acid, polymerized rosins and rosin-phenol; and terpenes and petroleum resins.

A content ratio of the tackifier in the second heat softening layer is preferably below 50% by weight of the total amount of the constituents.

The tackiness of the second heat softening layer can be improved without degrading an antiblocking property of the thermal transfer recording medium by limiting the content ratio of the tackifier to below 50% by weight.

Particularly, printing quality can be improved by limiting the content ratio of the tackifier to the range of 3 to 50% by weight.

In Constitution (2), it is preferable that the second heat softening layer contains a fusible material in addition to the tackifier, whereby the antiblocking property of the thermal transfer recording medium can be further improved and good printing quality free of stain can be provided even on a receiving medium of poor surface smoothness.

The fusible materials that can be contained in the second heat softening layer are the same as those described in the first heat softening layer.

When the second heat softening layer contains the fusible material, the content thereof in the second heat softening layer is normally 5 to 90% by weight, preferably 10 to 50% by weight.

In Constitution (3), the colorant and its amount added to the second heat softening layer are the same as those described in the first heat softening layer.

The thermoplastic resin contained in the second heat softening layer improves a fixativity of printed images.

The examples of the thermoplastic resin preferably used for this purpose include resins having a softening point of 60° to 130° C., preferably 70° to 100° C. Of the resins described in the first heat softening layer, that is, ethylene copolymers such as ethylene-vinyl acetate and ethylene-ethyl acrylate, acrylic resins, and vinyl chloride resins, polyamide resins, polyester resins, and polyurethane resins, the resins having a softening point in the above range can preferably be used.

These resins may be used singly or in combination.

In Constitutions (1) and (2), a content of the thermoplastic resin in the second heat softening layer is preferably 10 to 90% by weight of the total amount of the constituents; in Constitution (3), it is preferably 20 to 90% by weight, more preferably 50 to 90% by weight.

In this invention, it is preferable to use as thermoplastic resin at least one of ethylene-vinyl acetate copolymers containing more than 28% by weight of vinyl acetate, and ethylene-ethyl acrylate copolymers containing more than 28% by weight of ethyl acrylate.

Accordingly, in the present invention, high quality printing with excellent resolution can be achieved at higher speed on a receiving medium of poor surface smoothness by adding at least one of the preceding thermoplastic resins.

A melt index (MI value) of the preceding thermoplastic resins is preferably 2 to 1500, more preferably 10 to 1500.

In Constitution (3) where the third heat softening layer is provided on the second heat softening layer, the second heat softening layer preferably contains a tackifier or a nonionic surfactant in addition to the thermoplastic resin and the colorant, which makes it possible to soften rapidly the second softening layer in heating it with a thermal head of a printer and to provide a printed image of more improved quality in high speed printing.

The tackifier and nonionic surfactant used are the same as what are described previously. In Constitution (3), a content ratio of the tackifier is not more than 50% by weight of the total weight of the constituents; and that of the nonionic surfactant is preferably 1 to 50% by weight, more preferably 3 to 30% by weight.

The second heat softening layer may further contain a thickener, e.g. water soluble polymers such as sodium polyacrylate, polyvinylpyrrolidone, polyvinyl alcohol, water soluble polyurethane, water soluble acrylate and water soluble polyester; a substance for improving a slipping property of a thermoplastic resin surface, e.g. inorganic or organic grains such as colloidal silica and resin powder, and oils; and a resin plasticity controlling agent, e.g. compounds containing a polyoxyethylene chain.

The second heat softening layer can normally be provided on the first heat softening layer in direct contact therewith or via another layer such as an interlayer by the same coating process as that for the first heat softening layer.

In Constitutions (1) and (2), a thickness of the second heat softening layer is normally 0.3 to 5 μm, preferably 0.5 to 3 μm; in Constitution (3), it is preferably 0.3 to 3.5 μm.

Third Heat Softening Layer

The third key point in the present invention is that the third heat softening layer containing at least a fusible material is provided on the second heat softening layer in direct contact therewith or via another layer such as an interlayer, and is substantially colorless.

The third heat softening layer of the present invention comprises a function to provide a printed image of high quality and free of stain and tailing even in high speed printing, which ensures sufficient adhering and excellent fixing even to a receiving medium of poor surface smoothness.

This function of the third heat softening layer is considered to be provided mainly by the fusible material contained therein.

The fusible materials contained in the third heat softening layer are the same as those described in the first heat softening layer.

A content of the fusible material in the third heat softening layer is normally 50 to 100% by weight, preferably 70 to 100% by weight.

In the present invention, it is important that the third heat softening layer is substantially colorless.

To be more detailed, if the third heat softening layer substantially contains a colorant, a good adhesion thereof, which is attributable to the fusible material, may be degraded, which in turn may lead to degradation of fixativity of images printed at a high speed. In addition, a platen pressure raised in order to compensate adhesion degradation is liable to generate stain and tailing.

The state "substantially colorless" means avoidance of positive addition of a colorant, but does not mean exclusion of inherent color of each component in an ordinary state.

It is preferable that the third heat softening layer contains at least one of a thermoplastic resin, a tackifier and a nonionic surfactant. Such incorporation improves adhesion of the third heat softening layer, which results in improving quality of images printed on a receiving medium of poor surface smoothness at a high speed.

The thermoplastic resins contained in the third heat softening layer are the same as those described in the second heat softening layer.

A content of the thermoplastic resin in the third heat softening layer is preferably below 50% by weight of the total amount of the constituents.

The tackifiers contained in the third heat softening layer are the same as those described in the second heat softening layer.

A content of the tackifier in the third heat softening layer is preferably below 30% by weight of the total amount of the constituents.

The nonionic surfactants contained in the third heat softening layer are the same as those described in the second heat softening layer.

The preferable nonionic surfactants contained in the third heat softening layer are polyoxyethylene nonionic surfactants such as polyoxyethylene, fatty acid esters condensed therewith and fatty acid ethers condensed therewith.

A content of the nonionic surfactant contained in the third heat softening layer is normally 1 to 50% by weight, preferably 3 to 30% by weight of the total amount of the constituents.

The third heat softening layer can normally be provided on the second heat softening layer in direct contact therewith or via another layer such as an interlayer by the same coating process as that for the first heat softening layer.

A thickness of the third heat softening layer is preferably 0.2 to 5 μm.

Others

In the thermal transfer recording medium of the present invention, a peeling layer and/or an anchor layer may be provided between the support and the first heat softening layer, or an interlayer may be provided between the first and second heat softening layers.

Further, an overcoat layer may be provided on the second or third, heat softening layer.

After providing each layer as described above, the thermal transfer recording medium of the present invention is subjected to drying, surface smoothing and other processes according to necessity, and is cut to a desired shape.

The thermal transfer recording medium can be used in a form of a tape, typewriting ribbon, etc.

A method of thermal transfer for the present thermal recording medium is not different from conventional methods for thermal transfer recording, and explanation will be given to the example where a thermal head, the most typical heat source, is used.

First, a heat softening layer of a thermal transfer recording medium is brought into close contact with a receiving medium such as transfer paper. Then, the heat softening layer corresponding to a desired image or pattern is locally heated by applying a heat pulse with a thermal head, while applying a heat pulse with a platen from a back face of the transfer paper, if necessary.

The heated portion of the heat softening layer becomes hot to soften rapidly, and is transferred to the receiving medium.

The first heat softening layer containing at least a fusible material and a colorant can peel off easily from the support even in high speed printing; meanwhile, the second heat softening layer containing at least a nonionic surfactant and a thermoplastic resin can provide high adhesion even to a receiving medium of poor surface smoothness because of excellent tensile strength; therefore, high quality printed images free of void, stain and tailing can be achieved. Furthermore, in the constitution where the third heat softening layer is provided, the second heat softening layer containing at least the colorant and the thermoplastic resin makes it possible to provide high quality printed images on a receiving medium of poor surface smoothness even in high speed printing; the third heat softening layer containing at least a fusible material can provide high adhesion even to receiving medium of poor surface smoothness and ensures good fixativity of printed images; therefore, high quality printed images free of stain and tailing can be formed at high speed.

Measurements by the present inventor have shown that addition of the nonionic surfactant to the second heat softening layer increases tensile strength.

EXAMPLES

The examples and comparisons are shown to detail the present invention.

EXAMPLE 1

The following composition for the first heat softening layer was coated on a polyethylene terephthalate film of a thickness of 3.5 μm to form the first heat softening layer with a dry thickness of 2.0 μm.

Coating was conducted by a hot melt method with a wire bar.

| Composition for the first heat softening layer | |
|---|---|
| Paraffin wax | 30 wt % |
| Ester wax | 40 wt % |
| Ethylene-vinyl acetate copolymer | 10 wt % |
| Carbon Black | 20 wt % |

Next, the following composition for the second heat softening layer were coated on the first heat softening layer to a dry thickness of 2.5 μm to prepare a thermal transfer recording medium of the present invention.

Coating was conducted by a method using an organic solvent (heated MEK).

| Composition for the second heat softening layer | |
|---|---|
| Polyoxyethylene behenyl ether | 15 wt % |
| Ethylene-vinyl acetate copolymer | 65 wt % |
| Paraffin wax | 20 wt % |

EXAMPLE 2

The procedure of Example 1 was repeated, but the following composition was used in place of the composition for the second heat softening layer in Example 1.

| Composition for the second heat softening layer | |
|---|---|
| Polyoxyethylene stearate | 15 wt % |
| Ethylene-vinyl acetate copolymer | 85 wt % |

EXAMPLE 3

The procedure of Example 1 was repeated, but the following composition was used in place of the composition for the second heat softening layer in Example 1.

| Composition for the second heat softening layer | |
|---|---|
| Hexamer of glycerine | 20 wt % |
| Ethylene-ethyl acrylate copolymer | 80 wt % |

COMPARISON 1

The procedure of Example 1 was repeated, but the following composition was used in place of the composition for the second heat softening layer in Example 1. The high speed printing property was evaluated.

| Composition for the second heat softening layer | |
|---|---|
| Ethylene-vinyl acetate copolymer | 80 wt % |
| Paraffin wax | 20 wt % |

COMPARISON 2

The procedure of Example 1 was repeated, but the following composition was used in place of the composition for the second heat softening layer in Example 1.

| Composition for the second heat softening layer | |
|---|---|
| Paraffin wax | 20 wt % |
| Polyoxyethylene behenyl ether | 15 wt % |
| Ethylene-vinyl acetate copolymer | 45 wt % |
| Carbon Black | 20 wt % |

The thermal transfer recording media prepared as above were each loaded on a commercially available high speed printer (24-dot serial head, applied energy: 25 mJ/head), and an alphabet transfer (printing) test was conducted on Spica bond paper (Beck smoothness: 10 seconds) to evaluate a rough paper compatibility and a high speed printing property.

The results are shown in FIG. 1.

The rough paper compatibility and high speed printing property were evaluated as follows;

Rough Paper Compatibility and High Speed Printing Property

The printing test was conducted with a high speed printer at a printing speed of 60 cps and platen pressures of 350 and 450 g/head. A printing quality and a stain of the printed images were visually evaluated.

The symbols used in Table 1 are defined as follows;

TABLE 1

| | Printing quality |
|---|---|
| ◎ | No voids, and good sharpness. |
| ○ | No voids, and slightly poor sharpness. |
| Δ | A few voids. |
| x | Many voids. |
| | **Stain** |
| ○ | No stains. |
| Δ | A few stains in front of and/or at terminal of printed lines. |
| x | Noticeable stains. |

| | Rough paper compatibility and high speed printing quality (printing speed: 60 cps) Platen pressure (g/head) | | | |
|---|---|---|---|---|
| | 350 | | 450 | |
| | Printed character quality | Stain & tailing | Printed character quality | Stain & tailing |
| Example 1 | ◎ | ○ | ◎ | ○ |
| Example 2 | ◎ | ○ | ◎ | ○ |
| Example 3 | ○ | ○ | ◎ | ○ |
| Comparison 1 | x | ○ | Δ | ○ |
| Comparison 2 | x | x | ○ | x |

As can be seen from Table 1, the thermal transfer recording medium of the present invention has proven to be capable of forming high quality printed images of excellent printing sharpness and free of voids and stains even on a receiving medium of poor surface smoothness such as Spica bond paper and ensuring an excellent printing quality even in high speed printing.

EXAMPLE 4

The procedure of Example 1 was repeated, but the following compositions were used in place of the composition for the first and second heat softening layers in Example 1.

The composition for the first heat softening layer was coated to a dry thickness of 2.5 μm by the hot melt process with a wire bar.

| Composition for the first heat softening layer | |
|---|---|
| Paraffin wax | 50 wt % |
| Ethylene-vinyl acetate copolymer | 25 wt % |
| Carbon Black | 25 wt % |

The following composition for the second heat softening layer was then coated on the first heat softening layer to a dry thickness of 1.8 μm.

| Composition for the second heat softening layer | |
|---|---|
| Rosin (mp: 80° C.) | 20 wt % |
| Ethylene-vinyl acetate copolymer | 60 wt % |
| Paraffin wax | 20 wt % |

EXAMPLE 5

The procedure of Example 4 was repeated, but the following composition was used in place of the composition for the second heat softening layer in Example 4.

| Composition for the second heat softening layer | |
|---|---|
| Terpene resin (mp: 105° C.) | 30 wt % |
| Ethylene-ethyl acrylate copolymer | 30 wt % |
| Paraffin wax | 40 wt % |

EXAMPLE 4

The procedure of Example 4 was repeated, but the following composition was used in place of the composition for the second heat softening layer in Example 4.

| Composition for the second heat softening layer | |
|---|---|
| Petroleum resin (mp: 90° C.) | 15 wt % |
| Ethylene-vinyl acetate copolymer | 70 wt % |
| Carnauba wax | 15 wt % |

COMPOSITION 3

The procedure of Example 4 was repeated, but the following composition was used in place of the composition for the second heat softening layer in Example 4.

| Composition for the second heat softening layer | |
|---|---|
| Ethylene-vinyl acetate copolymer | 80 wt % |
| Polyester | 20 wt % |

COMPARISON 4

The procedure of Example 4 was repeated, but the following composition was used in place of the composition for the second heat softening layer in Example 4.

| Composition for the second heat softening layer | |
|---|---|
| Ethylene-vinyl acetate copolymer | 40 wt % |
| Rosin (mp: 80° C.) | 20 wt % |
| Paraffin wax | 20 wt % |
| Carbon Black | 20 wt % |

COMPARISON 5

The procedure of Example 4 was repeated, but the following composition was used in place of the composition for the second heat softening layer in Example 4.

| Composition for the second heat softening layer | |
|---|---|
| Ethylene-vinyl acetate copolymer | 60 wt % |
| Paraffin wax | 20 wt % |
| Carbon Black | 20 wt % |

COMPARISON 6

The procedure of Example 4 was repeated, but the following composition was used in place of the composition for the second heat softening layer in Example 4.

| Composition for the second heat softening layer | |
|---|---|
| Ethylene-vinyl acetate copolymer | 85 wt % |
| Carnauba wax | 15 wt % |

COMPARISON 7

The procedure of Example 4 was repeated, but the following composition was used in place of the composition for the second heat softening layer in Example 4.

| Composition for the second heat softening layer | |
|---|---|
| Petroleum resin (mp: 90° C.) | 15 wt % |
| Ethylene-vinyl acetate copolymer | 50 wt % |
| Carnauba wax | 15 wt % |
| Carbon Black | 20 wt % |

The thermal transfer recording media prepared as above were each loaded on a commercially available high speed printer (24-dot serial head, applied energy: 35 mJ/head), and an alphabet transfer (printing) test was conducted on Trojan bond paper (Beck smoothness: 2 seconds) to evaluate a rough paper compatibility and a high speed printing property.

The results are shown in Tables 2 and 3.

The rough paper compatibility and high speed printing property were each evaluated as follows;

Rough Paper Compability

The printing test was conducted with a high speed printer at a printing speed of 20 cps with a platen pressure varied as shown in Table 2. A printing quality, stain and tailing of the printed images were visually evaluated.

High Speed Printing Property

The printing test was conducted with a high speed printer at a platen pressure of 350 g/head and the printing speeds varied as shown in Table 3. A printing quality, stain and tailing of the printed images were visually evaluated. A peeling test with an adhesive tape (Post-it Tape, produced by Sumitomo 3M Ltd.) was also conducted to evaluate a fixativity of a printed image.

The symbols used in Tables 2 and 3 are defined as follows;

TABLE 2

| | |
|---|---|
| | Printed character quality |
| ⊚ | No voids with excellent edge sharpness. |
| ∘ | No voids. |
| Δ | A few voids. |
| x | Many voids. |
| | Stain |
| ∘ | No stains. |
| Δ | A few stains in front of and/or at terminal of printed lines. |
| x | Noticeable stains. |
| | Fixativity |
| ∘ | No change of printed characters. |
| x | Blurs of printed characters due to peeling with an adhesive tape. |

| | Rough paper compatibility Platen pressure (g/head) | | | |
|---|---|---|---|---|
| | 300 | | 500 | |
| | Printed character quality | Stain & tailing | Printed character quality | Stain & tailing |
| Example 4 | ∘ | ∘ | ⊚ | ∘ |
| Example 5 | ∘ | ∘ | ⊚ | ∘ |
| Example 6 | ∘ | ∘ | ⊚ | ∘ |
| Comparison 3 | x | ∘ | Δ | ∘ |
| Comparison 4 | Δ | x | ∘ | x |
| Comparison 5 | x | Δ | ∘ | x |
| Comparison 6 | x | ∘ | Δ | ∘ |
| Comparison 7 | Δ | x | ∘ | x |

TABLE 3

| | High speed printing property Printing speed (cps) | | | | | |
|---|---|---|---|---|---|---|
| | 30 | | | 50 | | |
| | Printed character quality | Stain & tailing | Fixativity | Printed character quality | Stain & tailing | Fixativity |
| Example 4 | ⊚ | ∘ | ∘ | ∘ | ∘ | ∘ |
| Comparison 3 | x | ∘ | x | x | ∘ | x |
| Comparison 4 | Δ | x | Δ | Δ | x | x |
| Comparison 5 | x | Δ | Δ | x | Δ | x |

As can be seen from Tables 2 and 3, the thermal transfer recording medium of the present invention has proven to be capable of forming high quality printed images free of stain and tailing even on a receiving medium of poor surface smoothness such as Trojan bond paper and ensuring an excellent fixativity without causing printing quality degradation even in high speed printing.

It was also confirmed that the printed images of Comparisons 4 and 5 where the second heat softening layers contain a colorant are inferior in sharpness and dot reproducibility to those of Examples 4 through 6 where the second heat softening layers are substantially colorless.

EXAMPLE 7

The following composition for the first heat softening layer was coated on a polyethylene terephthalate film of a thickness of 3.5 μm to form the first heat softening layer with a thickness of 1.5 μm.

Coating was conducted by a hot melt process with a wire bar.

| Composition for the first heat softening layer | |
|---|---|
| Paraffin wax | 95 wt % |
| Ethylene-vinyl acetate copolymer (vinyl acetate content: 40 wt %) | 5 wt % |

The following composition for the second heat softening layer was then coated on the first heat softening layer to a dry thickness of 1.5 μm.

| Composition for the second heat softening layer | |
|---|---|
| Ethylene-vinyl acetate copolymer (vinyl acetate content: 40 wt %) | 65 wt % |
| Paraffin wax | 10 wt % |
| Carbon Black | 25 wt % |

The following composition for the third heat softening layer was then coated on the second heat softening layer to a dry thickness 1.5 μm.

Coating of the second and third softening layers was conducted by a coating process using an organic solvent (methyl ethyl ketone).

| Composition for the third heat softening layer | |
|---|---|
| Paraffin wax | 80 wt % |
| Ethylene-vinyl acetate copolymer (vinyl acetate content: 40 wt %) | 20 wt % |

EXAMPLE 8

The procedure of Example 7 was repeated, but the following composition was used in place of the composition for the third heat softening layer in Example 7.

| Composition for the third heat softening layer | |
|---|---|
| Paraffin wax | 100 wt % |

EXAMPLE 9

The procedure of Example 7 was repeated, but the following composition was used in place of the composition for the second heat softening layer in Example 7 and coated to a dry thickness of 2.5 μm.

| Composition for the second heat softening layer | |
|---|---|
| Ethylene-vinyl acetate copolymer (vinyl acetate content: 40 wt %) | 30 wt % |

-continued

| Composition for the second heat softening layer | |
|---|---|
| Paraffin wax | 30 wt % |
| Rosin | 10 wt % |
| Polyoxyethylene monobehenyl ether | 10 wt % |
| Carbon Black | 20 wt % |

EXAMPLE 10

The procedure of Example 7 was repeated, but the following composition was used in place of the composition for the second heat softening layer in Example 7.

| Composition for the second heat softening layer | |
|---|---|
| Ethylene-vinyl acetate copolymer (vinyl acetate content: 40 wt %) | 80 wt % |
| Carbon Black | 20 wt % |

EXAMPLE 11

The procedure of Example 7 was repeated, but the following composition was used in place of the composition for the first heat softening layer in Example 7.

| Composition for the first heat softening layer | |
|---|---|
| Paraffin wax | 75 wt % |
| Ethylene-vinyl acetate copolymer (vinyl acetate content: 40 wt %) | 5 wt % |
| Carbon Black | 20 wt % |

COMPARISON 8

The procedure of Example 7 was repeated, but the following composition was used in place of the composition for the first heat softening layer in Example 7.

| Composition for the first heat softening layer | |
|---|---|
| Ethylene-vinyl acetate copolymer (vinyl acetate content: 40 wt %) | 100 wt % |

COMPARISON 9

The procedure of Example 7 was repeated, except that the first heat softening layer was removed.

COMPARISON 10

The procedure of Example 7 was repeated, but the following composition was used in place of the composition for the second heat softening layer in Example 7.

| Composition for the second heat softening layer | |
|---|---|
| Paraffin wax | 75 wt % |
| Carbon Black | 25 wt % |

COMPARISON 11

The procedure of Example 7 was repeated, but the following composition was used in place of the composition for the third heat softening layer in Example 7.

| Composition for the third heat softening layer | |
|---|---|
| Ethylene-vinyl acetate copolymer (vinyl acetate content: 40 wt %) | 100 wt % |

COMPARISON 12

The procedure of Example 7 was repeated, except that the third heat softening layer was removed.

The thermal transfer recording media prepared as above were each loaded on a commercially available high speed printer (48-dot serial head, 300 dpi, applied energy: 40 mJ/head), and an alphabet transfer (printing) test was conducted on Trojan bond receiving paper (Beck smoothness: 2 seconds) to evaluate a high speed printing property, a fixativity and a stain resistance on rough paper.

The results are shown in Table 4.

The high speed printing property, fixativity and stain resistance were each evaluated as follows;

High Speed Printing Property

The high speed printing test was conducted with a high speed printer at a printing speed of 50 cps and a platen pressure of 550 g/head. A printing quality, stain and tailing of the printed images were visually evaluated.

Fixativity and Stain Resistance

A peeling test was conducted with an adhesive tape (Post-it Tape, produced by Sumitomo 3M Ltd.) to evaluate the fixativity of a printed image. Printed characters were rubbed with copy paper and visually observed to evaluate the stain resistance.

The symbols used in Table 4 are defined as follows;

TABLE 4

| Symbol | Definition |
|---|---|
| | **Printed character quality** |
| ○ | No voids and blurs with excellent edge sharpness. |
| Δ | A few voids. |
| x | Many voids with illegible characters. |
| | **Stain** |
| ○ | No stains. |
| Δ | A few stains in front of and/or at terminal of printing lines. |
| x | Noticeable stains. |
| | **Tailing** |
| ○ | No tailing. |
| Δ | Tailing immediately after solid printing. |
| x | Noticeable tailing. |
| | **Fixativity** |
| ○ | No peeling of printed characters by tape. |
| Δ | Partial peeling. |
| x | Peeling. |
| | **Stain resistance** |
| ○ | No stain due to rubbing with copy paper. |
| Δ | Slight stain. |
| x | Noticeable stain. |

| | High speed printing property | | | | |
|---|---|---|---|---|---|
| | Printed character quality | Stain | Tailing | Fixativity | Stain Resistance |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | Δ | Δ |
| Comparison 8 | x | ○ | ○ | Δ | ○ |
| Comparison 9 | x | ○ | ○ | x | x |
| Comparison 10 | Δ | Δ | x | Δ | x |

TABLE 4-continued

| | | | | | |
|---|---|---|---|---|---|
| Comparison 11 | Δ | ○ | ○ | x | Δ |
| Comparison 12 | ○ | Δ | Δ | x | x |

As can be seen from Table 4, the thermal transfer medium of the present invention has proven to be capable of forming high quality printed images free of stain and tailing even on a receiving medium of poor surface smoothness such as Trojan bond paper (Beck smoothness: 2 seconds) and ensuring excellent fixativity and stain resistance on the receiving medium without causing printing quality degradation even in high speed printing.

What is claimed is:

1. A thermal transfer recording medium having a support and provided thereon, plural heat softening layers, comprising one of Constitutions (1) and (2);

Constitution (1): a support, a first heat softening layer containing at least a colorant and a fusible material, and a second heat softening layer containing at least a thermoplastic resin and a nonionic surfactant, in this sequence, wherein said second heat softening layer is substantially colorless;

Constitution (2): a support, a first heat softening layer containing at least a colorant and a fusible material, and a second heat softening layer containing at least a thermoplastic resin and a tackifier, in this sequence, wherein said second heat softening layer is substantially colorless.

2. The recording medium of claim 1, wherein said colorant is an organic and inorganic pigment or a dyestuff.

3. The recording medium of claim 1, wherein said fusible material is a vegetable wax, an animal wax, a petroleum wax, a mineral wax, a higher fatty acid, a higher alcohol, a higher fatty ester, an amide, or a higher amine.

4. The recording medium of claim 3, wherein said fusible material is a wax having a melting point of 50° to 100° C.

5. The recording medium of claim 1, wherein said thermoplastic resin is an ethylene copolymer, a polyamide resin, a polyester resin, a polyurethane resin, a polyolefin resin, an acrylic resin, a polyvinyl chloride resin, a diene copolymer, a cellulose resin, a rosin, a natural rubber, or a synthetic rubber.

6. The recording medium of claim 5, wherein said thermoplastic resin is an ethylene copolymer, an acrylic resin, or a diene copolymer each having a softening point of 60° to 130° C. and a melt index of 2 to 1500.

7. The recording medium of claim 6, wherein said softening point and melt index are 70° to 100° C. and 10 to 1500, respectively.

8. The recording medium of claim 1, wherein said nonionic surfactant is a polyvalent alcohol, a polyvalent alcohol fatty ester, a condensed polyvalent alcohol, a condensed polyvalent alcohol fatty ester, a polyoxyethylene alkyl ether, a polyoxyethylene fatty ester, or a polyoxyethylene polyvalent alcohol ether fatty ester.

9. The recording medium of claim 8, wherein said nonionic surfactant is a polyoxyethylene alkyl ether, a polyoxyethylene fatty ester. or a polyoxyethylene polyvalent alcohol ether fatty ester 10. The recording medium of claim 1, wherein said tackifier is a rosin, a hydrogenated rosin, a rosin-maleic acid adduct, a polymerized rosin, a terpene, or a petroleum resin.

11. The recording medium of claim 2, wherein content ratios of said colorant contained in the first softening layers of Constitutions (1) and (2) are independently 5 to 40% by weight of a total weight of constituents.

12. The recording medium of claim 11, wherein said content ratios are independently 10 to 30% by weight.

13. The recording medium of claim 3, wherein content ratios of said fusible material contained in the first softening layers of Constitutions (1) and (2), are 5 to 95% by weight and 5 to 95% by weight of a total weight of constituents, respectively.

14. The recording medium of claim 13, wherein said content ratios are 60 to 80% by weight and 60 to 80% by weight respectively.

15. The recording medium of claim 5, wherein content ratios of said thermoplastic resin contained in the second softening layers of Constitutions (1) and (2) are 10 to 90% by weight and 10 to 90% by weight, of a total weight of constituents, respectively.

16. The recording medium of claim 8, comprising Constitution (1) and wherein a content ratio of said nonionic surfactant contained in the second softening layer of Constitution (1) is 1 to 50% by weight of a total weight of constituents.

17. The recording medium of claim 16, wherein said content ratio is 3 to 30% by weight.

18. The recording medium of claim 10, comprising Constitution (2) and wherein a content ratio of said tackifier contained in the second softening layer of Constitution (2) is 3 to 50% by weight of a total weight of constituents.

19. The recording medium of claim 13, comprising Constitution (2) wherein said fusible material is contained in the second softening layer of Constitution (2).

20. The recording medium of claim 19, wherein a content ratio of said fusible material is 5 to 90% by weight of a total weight of constituents.

21. The recording medium of claim 20, wherein said content ratio is 10 to 50% by weight.

22. The recording medium of claim 15 comprising Constitution (1) and, wherein said thermoplastic resin is contained in the first softening layer of Constitution (1).

23. The recording medium of claim 15, wherein content ratios of said thermoplastic resin in the first softening layers of Constitutions (1) and (2) are 1 to 40% by weight and 0.3 to 4.0% by weight, respectively.

24. The recording medium of claim 23, wherein said content ratios are 5 to 15% by weight and 0.8 to 2.5% by weight, respectively.

25. The recording medium of claim 13, wherein thicknesses of the first softening layers of Constitutions (1) and (2) are 0.3 to 8.0 μm and 0.6 to 8.0 μm, respectively.

26. The recording medium of claim 15, wherein thicknesses of the second softening layers of Constitutions (1) and (2) are 0.3 to 5.0 μm and 0.5 to 3.0 μm, respectively.

27. The recording medium of claim 1 comprising Constitution (1).

28. The recording medium of claim 1 comprising Constitution (2).

* * * * *